United States Patent [19]

Briggs et al.

[11] Patent Number: 4,472,478
[45] Date of Patent: Sep. 18, 1984

[54] FIBROUS COMPOSITE MATERIALS AND THE PRODUCTION AND USE THEREOF

[75] Inventors: Peter J. Briggs, Cheadle Hume; Kevin McAloon, Warrington, both of England

[73] Assignee: Imperial Chemicals Industries Ltd., London, England

[21] Appl. No.: 545,104

[22] Filed: Oct. 24, 1983

Related U.S. Application Data

[63] Continuation of Ser. No. 281,107, Jul. 7, 1981, abandoned.

[30] Foreign Application Priority Data

Jul. 11, 1980 [GB] United Kingdom ............... 8022713

[51] Int. Cl.³ .......................... B32B 5/16; D02G 3/00
[52] U.S. Cl. .............................. 428/283; 162/181.4; 162/181.5; 162/181.6; 162/181.8; 428/281; 428/288; 428/324; 428/372; 428/454
[58] Field of Search ............... 428/281, 283, 289, 323, 428/288, 324, 454; 162/156, 181.4, 181.5, 181.6, 181.8

[56] References Cited

U.S. PATENT DOCUMENTS

| | | | |
|---|---|---|---|
| 2,481,391 | 9/1949 | Campbell | 106/84 |
| 2,782,129 | 2/1957 | Donegan | 428/281 X |
| 3,434,917 | 3/1969 | Kraus et al. | 162/3 |
| 3,540,892 | 11/1970 | Lard et al. | 106/18.11 |
| 3,556,819 | 1/1971 | Koons | 106/18.11 |
| 3,779,860 | 12/1973 | Oshida | 162/181.6 |
| 3,916,057 | 10/1975 | Hatch et al. | 162/181.6 |
| 4,271,228 | 6/1981 | Foster | 428/281 |

*Primary Examiner*—Lorraine T. Kendell
*Attorney, Agent, or Firm*—Cushman, Darby & Cushman

[57] ABSTRACT

A fibrous composite material in the form of individual fibres, sheets, layers or lightweight blocks comprising non-combustible fibres and lamellae of a layer mineral, a method for the manufacture of the fibrous composite materials by applying lamellae of a layer mineral to the fibres preferably from suspension followed by removal of the liquid phase of the suspension, and use of the fibrous composite materials for the fire-protection of substrates.

16 Claims, 2 Drawing Figures

FIBROUS COMPOSITE MATERIALS AND THE PRODUCTION AND USE THEREOF

This is a continuation of application Ser. No. 281,107, filed July 7, 1981 now abandoned.

This invention relates to fibrous materials and particularly to fibrous composite materials comprising fibres which have been coated with or embedded in an inorganic material to upgrade the fibres, and to the production and use of the fibrous composite materials.

Fibres and fibrous materials made from them are notoriously susceptible to damage or destruction by fire. Fibres, whether natural or man-made fibres, comprising organic materials, for example wool, cotton, rayon, cellulose acetate, polyesters, polyamides and lignocellulosic fibres are generally readily flammable. Fibres comprising inorganic materials, for example glass fibres, are inflammable but are generally low melting materials so that while they are inflammable they melt in a fire situation. Both types of fibres offer little if any resistance to the spread of a fire and are not flame-retardant. The higher melting inorganic fibres, for example the so-called ceramic fibres such as aluminosilicate fibres, mineral wools and polycrystalline alumina fibres are much more resistant to fire but in general are too expensive for most practical uses of fibres.

It would clearly be advantageous, for example in the textile, furnishing and building industries, if fibres and particularly the less expensive, low-melting inorganic fibre, could be upgraded to improve their fire performance e.g. fire resistance and flame retardancy, and numerous treatments have been proposed for achieving this desirable result by coating the fibres with or embedding them within a fire-resistant material or by incorporating a fire-resistant material in the fibre structure. Hitherto, no satisfactory solution to the problem has been achieved; in particular no solution has been found which combines satisfactory fire performance with acceptable expense whilst retaining the flexible nature of the fibres and materials made from them.

Figure 1:
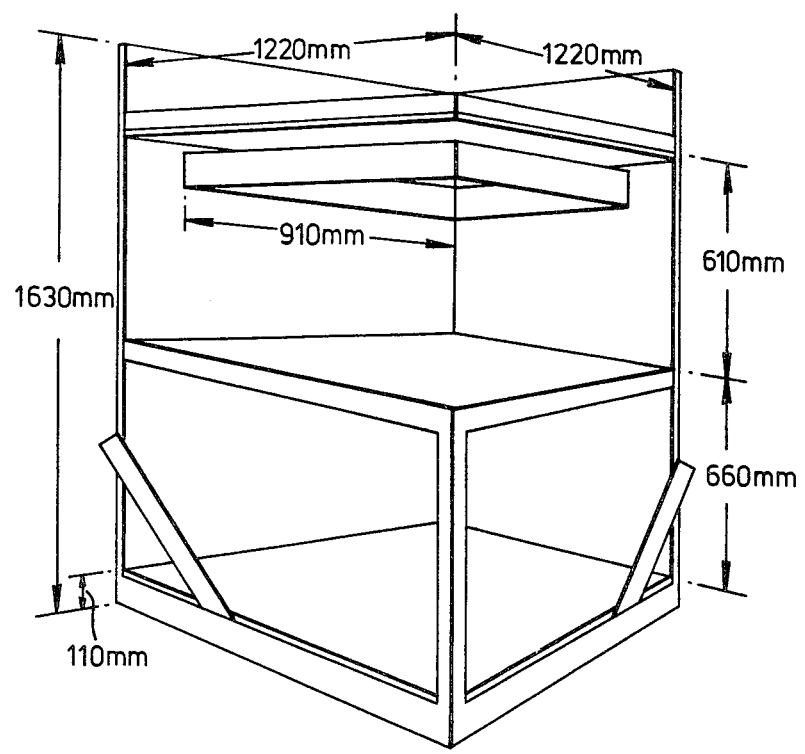
FIG. 1 is a diagrammatic perspective view of a testrig for carrying out the mini-corner fire test used to evaluate the surface burning characteristics of building materials in Example 15.

According to the present invention there is provided a fibrous composite material comprising non-combustible fibres and lamellae of a layer mineral. Preferably the fibrous composite material comprises at least 15% by weight and preferably at least 20% by weight of the fibres.

There is also provided a method for the manufacture of the fibrous composite material by applying the lamellae to fibres, preferably from suspension in an inert carrier liquid.

The method for the manufacture of the composite material is also a method of upgrading the fireperformance of non-combustible fibres.

Vermiculite is the preferred layer mineral. By "vermiculite" we mean all materials known mineralogically and commercially as vermiculite, including the chlorite-vermiculites.

By the term "lamellae of a layer mineral" as used throughout this specification we mean tiny particles of the layer mineral obtained by chemically delaminating the layer mineral into particles or platelets having a high aspect ratio. Thus for example vermiculite lamellae obtained by chemical delamination are tiny platelets obtained by chemical delamination of vermiculite and having a thickness of less than 0.5 micron, usually less than 0.05 micron and preferably less than 0.005 micron, and having an aspect ratio (i.e. length or breadth divided by thickness) of at least 10, preferably at least 100 and more preferably at least 1000, for example 10,000. The lamellae obtained by chemical delamination of other layer minerals are of similar dimensions to those of vermiculite lamellae.

Whilst vermiculite is the preferred layer mineral, other layer minerals which may be used include montmorillonite, Kaolinite (and clays comprising sepiolite, Kaolinite, for example kaolins and ball clays) and other layer-silicate minerals which can be chemically deliminated to provide lamellae or plate-like particles.

The fibrous composite materials of the invention may have a wide variety of forms and the layer mineral lamellae may be present in the composite as a coating on the individual fibres of the composite, as a layer in which the fibres are embedded or as a coating or facing layer on one or both sides of a fibrous material such as a woven fabric or a felt, or as an inner layer between layers of the fibrous material. By way of illustration only and without in any way restricting the scope of the present invention, the following product forms are included within the term fibrous composite material:

1. A layer of fibres faced on one or both sides with a layer of lamellae.
2. Strands comprising multiple filaments, e.g. 100 to 1000 filaments, having lamellae coated onto the individual filaments and/or onto the strands.
3. Rovings comprising multiple strands twisted, doubled or plied together, having lamellae coated onto the filaments and/or the strands and/or onto the rovings.
4. A layer of fibres bonded together by lamellae.
5. Fibrous blocks comprising a mass of fibres cemented together at their points of contact by the lamellae of the layer mineral and preferably also coated individually or in groups with the lamellae. The fibres may be randomly oriented throughout the blocks to provide a lightweight block of open three-dimensional structure exhibiting good heat and sound insulation properties.
6. A multi-layer structure comprising two or more layers of a composite material such as a coated or impregnated fabric or felt laminated together using a conventional adhesive or preferably using the lamellae of the layer mineral as the adhesive. Heat-resistant boards as are commonly used for work surfaces in kitchens are a specific example of such a structure.

It will readily be appreciated that each of the above product forms comprising a layer of fibres may comprise a multi-layer structure of fibres and that the fibre layers may comprise loose fibres or may be a woven, knitted, needlepunched, felted or otherwise unified structure. Furthermore, it is to be understood that in any of the product forms of the fibrous composite material the fibres may be continuous (filamentary) or discontinuous (staple), or agglomerates of fibres such as glass wool or glass-fibre tapes.

The amount by weight of lamellae applied to the mass of fibrous material may vary within wide limits depending for example upon the intended fire/temperature duty of the composite, the desired flexibility of the composite, the required degree of structural integrity of the composite before and after it has been subjected to a fire and whether the lamellae are applied as a coating or a facing for the fibrous material. In general, increasing the loading of lamellae on the fibrous material will increase the fire-performance of the fibres and the thermal conditions which the composite will withstand. We have observed, however, that in general very thin layers of lamellae, for example less than 1 micron thickness, are all that is required to upgrade the fire-performance and the high-temperature performance of the fibres. As a guide only, the loading of the layer mineral on the fibres of the composite will usually be from 0.05% to 100% by weight, typically from 0.1% to 20% by weight, of the fibres. Amounts of the layer mineral greater than these may be used and indeed the composite may comprise as much or even more layer mineral than fibres such that the composite is in effect a fibre-reinforced layer of lamellae, for example where high flexibility in the composite is unnecessary or undesirable; the amount of fibres in such a structure should be at least 15% by weight and may be, for example from 20% to 50% by weight of the composite.

The amount of lamellae applied to the fibres will affect the degree of damage suffered by the fibres when the composite material is exposed to a flame or, especially in the case of low-melting fibres, to temperatures above the melting point of the fibres. Meltable fibres coated thinly with the layer mineral may be melted or softened by a flame or high temperature whilst increasing the coating thickness increases the resistance of the fibres to melting and softening. In most practical applications of the invention the fibres of the composite material are likely to be damaged or even completely melted by a flame or high temperatures, but in spite of this the fire-performance of the composite material is not seriously impaired, especially the fire-barrier and flame-retardant properties of the composite material.

For example, low-melting glass fibres encapsulated with vermiculite lamellae may soften and even melt in a fire, but the softened or molten glass is retained by the coating and glass fibre reform on cooling the composite material.

It is known that thin sheets or papers can be formed from suspensions of lamellae of vermiculite and that such sheets can be used to face combustible organic foam materials for fire-protection, such a product being described for example in our United Kingdom patent specification No. 2,007,153. We have observed, however, that when exposed to a fire such sheets or papers tend to curl and crack and thus do not satisfactorily retard the spread of flames and do not provide an adequate fire-barrier to protect combustible substrates on which they are used as facing materials. By contrast, and surprisingly, we have found that when the fibrous composite materials of the invention are exposed to a fire they do not curl or crack even when the coating layer of lamellae is extremely thin. Thus the fibrous composite materials of the invention provide better fire-barriers than sheets or papers comprising lamellae alone.

The fibrous composite materials are made by applying the layer mineral lamellae to a suitable fibrous substrate. Usually the lamellae will be applied from a suspension in a carrier liquid which may be for example an organic liquid, or water or another aqueous medium.

Conveniently the suspension obtained in the process used for chemical delamination of layer minerals can be used directly to form the fibrous composite material. If desired, however, lamellae in the form of a free-flowing dry powder (as described for example in our European patent publication No. 0009.311A) may be suspended in any suitable carrier liquid for application to the fibrous substrate. The solids content (lamellae) of the suspension is not critical may vary over a wide range. Any stable suspension may be employed. Typically, the solids content of the suspension will be up to 40% by weight of the suspension but may for the production of thin coatings be only a few %, say 2% by weight. Preferably the solids content of the suspension for most applications will be from 10% to 20% by weight although suspensions of higher solids content for example up to 50% by weight, may be preferred for making fibrous blocks. After application of the suspension of the layer mineral to the fibrous substrate, the carrier liquid is removed, usually by evaporation, to leave the lamellae of the layer mineral deposited, preferably as a coherent layer, on the fibrous substrate. If desired excess carrier liquid may be sweezed from or allowed to drain from the composite material prior to heating the composite material to remove residual carrier liquid. The temperature at which the suspension is applied to the fibrous substrate can be any temperature up to or even greater than the boiling point of the carrier liquid, providing of course that the fibres are stable at such temperatures. We prefer to avoid temperatures above the boiling point of the carrier liquid since unless care is exercised a rapid evolution of gas may have an adverse effect upon the properties of the composite material.

The suspension (or slurry as it may also be termed) can be applied to the fibrous substrate by any known technique, including brushing (painting), spraying, doctoring, licking, knifecoating, 'nip'-coating, roller-coating, dip coating and impregnation or, in the case of loose fibres by co-depositing the fibres and layer minerals. It is a simple matter for the operator to choose a suspension strength and an application technique appropriate to applying the desired loading of lamellae onto any particular fibrous substrate.

The application technique employed for applying the lamellae to the fibrous substrate may vary according to the desired final form of the composite material, being different perhaps for coating individual fibres, strands and rovings than for coating woven, felted or otherwise unified fibrous materials, or for producing fibrous blocks.

If desired, the suspension of lamellae may be gasified to produce a froth for application to the fibrous substrate so that the layer mineral content of the resulting composite material may be present as a cellular (rigid foam) matrix. Conversion of a suspension of vermiculite lamellae to rigid foams is described, for example, in our United Kingdom Patent Specification No.1,585,104.

In the case of coating individual fibres or yarns or strands, a specific embodiment of the invention residues in applying the coating during production of the fibre, yarn or strand. Thus for example, in the spinning of fibres such as glass fibres the "green", freshly-extruded fibres may be coated immediately with the suspension of lamellae, for example by spraying the fibres at a suitable point below the spinnerette orifice(s) or by spinning the fibres into a bath of the suspension. An alternative technique for coating fibres immediately after their extrusion is to dust the "green" fibres whilst they are still sticky with powder comprising the lamellae; however, because of the self-adhesion properties exhibited by the lamellae, especially vermiculite lamellae when deposited from aqueous suspension we prefer to apply an aqueous suspension to the fibres rather than dry powder.

Another technique for applying the lamellae to fibres is to employ a suspension of the lamellae as a textile size. Thus, for example, the suspension may be applied to glass fibres as a size using the techniques described in United Kingdom patent specification No. 2,016,993 and by K. L. Loewenstein in "The Manufacturing Technology of Continuous Glass Fibre" (an Elsevier publication).

Another technique particular to a specific product form arises in the case where the fibrous substrate of the composite material is a mat of fibres produced by a wet-lay or paper-making technique in which the fibres are suspended in a carrier liquid, usually water, and the fibre mat is laid down from the suspension. In such a case the suspension of fibres may include the lamellae by suspending the fibres in a suspension of lamellae, by suspending lamellae in a suspension of fibres or by mixing suspensions of fibres and lamellae. In this technique, a small amount of an organic binder, for example a rubber latex or polymer latex is often included in the suspension to afford handleability to the resulting mat, the organic binder subsequently being removed if desired by burning (provided, of course, that the fibres will withstand the burning conditions).

After application of the suspension of lamellae to the fibrous substrate, the wet substrate preferably is squeezed or callendered to remove any air (especially bubbles) which may have become entrained, thereby enhancing the aesthetic appearance and handle of the composite material and reducing the occurrence of blistering of the coating in a fire.

The fibrous composite materials of the invention exhibit improved fire-performance and high temperature performance compared with the corresponding material made of the untreated fibres although the K-factor of the treated fibres will usually be slightly higher than that of the untreated fibres. Thus fibres which melt at low temperatures can be upgraded to higher temperature performance; for example, low melting glass fibres can be upgraded by the application of vermiculite lamellae to achieve the high temperature performance commonly attributed only to asbestos fibres, mineral wool and the so-called ceramic fibres. Higher-melting fibres such as asbestos, mineral wool and ceramic fibres are up-graded to even higher temperature performance. It is a general feature of the invention that the fire-performance and thermal properties of all non-combustible fibres and fibrous materials are upgraded by the application to them of a coating of lamellae of a layer mineral.

As stated hereinbefore, vermiculite is the preferred layer material. The reason for this preference is that in addition to conferring good fire resistance and thermal performance to the fibrous composite materials, chemically delaminated vermiculite when deposited from aqueous suspensions exhibits excellent self-adhesion properties. Upon removal of the water (or other carrier liquid) from suspensions of lamellae of chemically delaminated vermiculite, the lamellae mutually adhere together to form a relatively strong layer of vermiculite, and fibrous composite materials containing vermiculite lamellae benefit from this self-adhesion characteristic of the applied lamellae in that the strength and durability of the composite is enhanced. The deposited vermiculite lamellae may act as an adhesive to bond the fibres of the fibrous substrate together and/or to bond the composite to other materials for example to form laminates.

In addition to upgrading the fire resistance and high temperature performance of the fibres to which the coating layer of lamellae is applied, the coating may afford the further advantage of conferring vapour-barrier characteristics and particularly water vapour-barrier characteristics on the fibrous films deposited from suspensions of lamellae, especially vermiculite lamellae, have low vapour transmission coefficients, especially low water-vapour transmission coefficients such that the fibrous composite materials of the invention can be used as barrier layers to inhibit the ingress of water vapour into materials such as foams (where the ingress of water can impair the insulation value of the foam on ageing) or waterdegradable materials.

Another advantage afforded by coating noncombustible fibres with lamellae is that the fibres are rendered more flame-retardant. However flame may tend to spread over the surface of the composite material and if desired there may be incorporated in the composite material and especially the surface thereof flame-retardant additives such as halogenated compounds, antimony trioxide aluminium trihydrate, borates and phosphates. A still further advantage afforded by coating non-combustible fibres with lamellae is that the coating is chemically inert and in particular is acid and alkali resistant. Thus fibres which are not normally useable in alkaline environments, for example glass fibres, can be rendered suitable for such use. A specific embodiment of the fibrous composite material of the invention is constituted by alkali-resistant glass fibre which comprises glass fibre having thereon a coating of lamellae of a layer mineral, preferably vermiculite lamellae.

The fibrous composite materials described hereinbefore and comprising unmodified coatings comprising lamellae of a layer mineral are useful materials for a wide variety of applications. However, in applications where the composite material is liable to be subjected to liquid water, it is preferred to modify the coatings to confer improved water-stability upon the composite. Unmodified coatings tend to disintegrate in liquid water; however, they are readily modified to make them stable in liquid water. Composite materials comprising vermiculite lamellae can be made water stable by treatment with a solution, for example a saturated solution, of a magnesium salt such as magnesium chloride, by treatment with ammonia or the vapour of an alkylamine, or by incorporating a water-stability improver in the suspension of lamellae applied to the fibrous substrate, as is described, for example, in our European patent publication No. 0.009.310 A1. Suitable water-stability improvers are particulate compounds sparingly soluble in water and having a basic reaction in water, for example calcium oxide and magnesium oxide.

Magnesium oxide is the preferred water-stability improver and in addition to conferring water stability to the composite material, this additive enhances the strength of the composite. Magnesium oxide is a particularly desirable additive to gasified (frothed) vermiculite suspensions used to form the composite material in that it additionally enhances the compressive strength of the cellular (rigid foam) vermiculite matrix of the composite material. The amount of water-stability improver will usually be up to 15% by weight, typically 10% by weight based on the lamellae.

Water-proofing of the composite materials, as opposed to improving their stability in liquid water, can be effected by incorporating a silicone polymer precursor in the suspension of lamellae prior to application of the suspension to the fibrous material, and treating the composite material with an acidic gas in the presence of water to polymerize the precursor and form a silicone polymer in the composite material. Such a water-proofing process is described in our co-pending United Kingdom patent application No. 8103459. Thus, for example, sodium methyl siliconate can be incorporated in the suspension and the resulting composite material treated with carbon dioxide in the presence of water (during drying of the composite material or subsequent to drying the composite and re-wetting it). The amount of silicone polymer precursor added to the suspension will usually be up to about 5% by weight, typically about 2% by weight, based on the lamellae.

Any suspension of lamellae of layer minerals may be used to form the composite materials of the invention. Chemical delamination of layer minerals is well known and any of the known chemical delamination processes may be employed, including the processes described for chemically delaminating vermiculite in United Kingdom patent specifications Nos. 1,016,385; 1,076,786; 1,119,305 and 1,585,104 and by Baumeister and Hahn in "Micron" 7 247 (1976). Preferably, the suspension of chemically delaminated layer mineral is subjected to a wet-classification treatment in which larger particles of the mineral are removed, as is described in respect of suspensions of vermiculite lamellae in our United Kingdom patent application No. 39510/76:51425/76 and German OLS No. 2.741.859. For use in the process of the present invention, the suspension preferably is wet-classified to a particle size (platelets) below 50 microns, so that the suspension exhibits colloidal properties. Typical suspensions of vermiculite lamellae obtained by the process described in United Kingdom patent specification No. 1,585,104, wet -classified to particles of below 50 microns comprise about 40% of particles in the size range 0.4 to 5.0 microns. Such suspensions are the preferred suspensions for making the fibrous composite materials of the present invention. The fibrous composite materials of the invention can be used in any applications where the corresponding fibrous materials are commonly employed, and additionally they enable particular fibres to be used in numerous applications where hitherto those fibres have been considered unusable because they exhibit unsatisfactory fire performance. Thermal insulation and fire-barier uses hitherto considered the sole province of asbestos, ceramic fibres and refractory fibres are made available to less expensive, less specialist glass fibres whilst the specialist fibres themselves are upgraded to even higher thermal stability and more stringent fire-protection uses.

Included amongst the many uses of the fibrous composite material of the invention is the fire-protection of flammable and/or low-melting materials such as rubber and plastic foams, sheets and films, aluminium, wood, paper, cardboard, glass, and the like. For such uses, the fibrous composite material may be provided as a loose covering not bonded to the flammable substrate but we have found that best results are obtained if the composite is bonded to and laminated with the substrate. The composite may be laminated with the substrate using conventional adhesive although in most cases where the layer mineral is vermiculite, the adhesive nature of the lamellae deposited from suspension enables another adhesive to be dispensed with. Thus for example application of the wet composite (i.e. the fibrous substrate plus vermiculite suspension) will often result in a satisfactory bonding of the composite to the substrate. Alternatively, the composite may be formed in situ on the substrate to be protected, for example by coating the substrate with vermiculite suspension and then pressing a fibrous material onto (and into) the wet vermiculite layer; if desired a further layer of vermiculite may then be applied over the fibrous material to 'face' the laminate with vermiculite lamellae.

The composite material may if desired contain other substances, e.g sizes, lubricants and binders on the fibres, or conventional fire retardant additives. The fibrous composite materials are also useful in applications which do not specifically require fire-retardance and good thermal properties, for example as reinforcement layers for organic and inorganic materials, e.g. polymers, rubbers, plastics and cements. Uses involving reinforcement of organic materials with fibres include GRP (glass reinforced plastic) applications.

The invention is illustrated but in no way limited by the following Examples in which the following general procedure was used to prepare the vermiculite suspensions.

PREPARATION OF VERMICULITE SUSPENSIONS 150 parts of vermiculite ore (Mandoval micron grade, ex-South Africa) are agitated with saturated sodium chloride solution in 1:2 ratio by weight in a tank for 30 minutes at 80° C. This suspension is then centrifuged and washed with deionised water. The wet cake is transferred to a second tank where the vermiculite is stirred with 1.5 N n-butylamine hydrochloride (2:1 liquid:solid ratio) for 30 minutes at 80° C. This suspension is then centrifuged and washed with deionised water before transferring the wet cake to a swelling tank in which the vermiculite is stirred in deionised water. After swelling, the suspension contains approximately 20% solids and the particles are random sized in the range 300–400 micron. This suspension is then passed through a stone-type mill which reduces approximately 50% of the particles to platelets of size less than 50 microns. This milled suspension is classified in a weir-type centrifugal classifier and the lighter particles with sieve size less than 50 micron are collected for use. Analysis of this 18–21% solids suspension by photosedimentometer and disc centrifuge reveals that approximately 40% of the particles have a size ("equivalent spherical diameter") of 0.4–1.0 micron. The solids content of the suspension is readily adjusted by adding water to it or removing water from it.

EXAMPLE 1

A 4% by weight vermiculite lamellae slurry was prepared using the general procedure described above. Glassfibre tissue mat F4/50/AG supplied by Regina-Fibreglass Ltd was dipped into this slurry and on removal, excess slurry was squeezed out of the mat. The mat was then dried in air overnight and the weight of vermiculite impregnated in the mat was determined to be 41.3 g/m$^2$.

Glassfibre tissue mat F4/50/AG is produced at 50 g/m$^2$ using a dry process. The glass fibre filaments are melted from C-glass and are spun to 13 micron diameter. The matrix of approx 0.5 m long filaments are bonded with 10% acrylic binder. The vermiculite treatment gives an additional binding effect to this organic binder; (in production of the glass fibres, the binder could be replaced by vermiculite).

A 200 mm×110 mm sample of the untreated glass-fibre tissue mat was subjected to a fire test over a calor gas burner fitted with a circular jet of diameter 40 mm, the sample being held on a tripod stand 30 mm above the burner jet. The temperature of the flame at the sample position was determined as 1075° C. The untreated sample curled up instantaneously as the glass fibres melted. Flame penetration of the sample was estimated at 1 to 2 seconds.

A sample of the vermiculite-treated glassfibre tissue mat was subjected to the first test. This sample retained its dimensional stability in the flame and only showed localised flame penetration (an area about 4 mm×2 mm) after 42 seconds. After 3 minutes, the sample was still substantially intact and the flame caused no further damage.

EXAMPLE 2

The procedure of Example 1 was repeated with a 120 g/m² continuous strand glassfibre mat, Unifilo PS271 (supplied by Balzaretti Modigliani Spa, Italy). The untreated mat was burnt through in only 3 to 4 seconds whereas the vermiculite-treated mat containing 16.4 g/m² vermiculite survived 3 minutes in the flame at 1075° C. with only localized melting at a few strand ends.

EXAMPLE 3

The procedure of Example 1 was repeated using 2 lb/ft³ insulation glass fibre slab supplied by Newalls Insulation and Chemical Co Ltd., Washington, Durham. An untreated sample 150 mm×100 mm×15 mm thick melted through rapidly with flame penetration after only 52 seconds in the 1075° C. fire test. The vermiculite-treated glassfibre slab resisted burn through and was virtually unaffected by 10 minutes in the flame.

EXAMPLE 4

The procedure of Example 1 was repeated using a 600 tex glass fibre roving supplied by TBA Industrial Products Limited of Rochdale, Lancashire. The untreated roving was held across the 1075° C. flame and melted through in approx 2 seconds. The vermiculite-treated roving survived for 7 seconds in this flame.

EXAMPLE 5

18% by weight solids Vermiculite slurry was applied by two nip rollers to 53g/m² wet-processed glassfibre tissue mat, type IE50U supplied by Regina-Fibreglass Ltd. After drying, the weight of vermiculite was determined as 50 g/m² and this treatment had fully impregnated the glassfibre mat giving a dust-free, flexible mat. A 130 mm×60 mm sample of untreated glassfibre mat was penetrated in 5 seconds in the 1075° C. flame test described in Example 1. The vermiculite-treated glassfibre mat was practically unaffected after 4 minutes in the flame.

EXAMPLE 6

18% by weight solids Vermiculite slurry was spread with a knife coater over 70 g/m² wet-processed glassfibre tissue mat, type IE70M supplied by Regina-Fibreglass Ltd. After drying, the weight of vermiculite was determined as 70g/m².

A 130 mm×60 mm sample of untreated glassfibre mat was penetrated in 4 seconds by the 1075° C. flame described in Example 4. The vermiculitetreated glassfibre mat exhibited a surface spread of flame at 3 seconds but no flame penetration of the mat occurred over 4 minutes. The same result was obtained whether the vermiculite layer or the glassfibre layer was directly impinged by the gas flame.

EXAMPLE 7

The procedure of Example 1 was repeated using 53g/m² glassfibre tissue mat IE50U supplied by Regina-Fibreglass Ltd. and made using E-glass fibre and approx 18% by weight urea-formaldehyde binder. After drying, the mat was found to be completely impregnated with 8g/m² vermiculte.

A 100 mm×60 mm sample of untreated glassfibre mat ignited in 0.5 seconds and was penetrated in 4 seconds by the 1075° C. gas-flame. The vermiculite impregnated mat rermained rigid and unaffected after 3 minutes in this flame.

EXAMPLE 8

Glassfibre mat IE50U was heated in a furnace at 350° C. for 24 hours to remove the organic binder. The resulting mat was carefully dipped into 4% by weight vermiculite slurry and after squeezing excess slurry off with a roller, the treated mat was dried and then subjected to the 1075° C. gas-flame test described in Example 1, with the following results:

|     | Weight of impregnated vermiculite (g/m²) | Time for flame to penetrate mat |
| --- | --- | --- |
| (a) | 0 | 2 seconds |
| (b) | 5 | 34 seconds |
| (c) | 19 | Greater than 3 mins |

EXAMPLE 9

Glassfibre veil (IE50U) of weight 63.5 g/m² was dressed with a 10% by weight suspension of vermiculite lamellae and the treated veil was air-dried at room temperature overnight followed by heating at 80° C. in an oven for 30 minutes. The vermiculite loading was 58.7 g/m².

A sample of the treated veil was placed over a bunsen burner stand and placed directly in a bunsen burner flame. The veil was not penetrated by the flame after several minutes and the fibrous structure of the veil was not destroyed. By contrast, when a sample of the untreated veil was tested in the bunsen flame the glass fibres melted rapidly and the veil was penetrated by the flame within 3 seconds.

EXAMPLE 10

This example illustrates the usefulness of the fibrous composite material described in Example 9 as a fire barrier for the protection of aluminium plates.

A 7.5 cm square plate of 22 S.W.G. (approx 1 mm) aluminium were sanded to clean, bare metal and coated with sodium silicate solution. A piece of dry, vermiculite-dressed glass fibre veil as described in Example 9 was applied over and pressed onto one surface of the plate whilst the latter was still wet. The resulting laminate was allowed to dry in air overnight and then was heated at 60° C. for 30 minutes in an oven to complete the drying. The dry laminate was cooled and the veil was found to be firmly bonded to the aluminium plate.

The laminate was placed directly in a bunsen burner flame with the vermiculite-dressed glassfibre veil lowermost (towards the flame). After 4 hours the laminate was still intact; the aluminium had not melted and the fibrous structure of the glassfibre veil was retained.

By contrast when an untreated aluminium plate of the same dimensions was subjected to the same test; the aluminum soon melted and the flame penetrated the plate after less than 1 minute.

EXAMPLE 11

An aluminium bar 20 cm×1.25 cm×0.6 cm was sanded to clean, bare metal and coated with aqueous sodium silicate solution. Whilst still wet the bar was wrapped in a piece of the dry, vermiculite-dressed glassfibre veil described in Example 9 and the assembly was air-dried overnight followed by heating at 60° C. for 30 minutes in an oven. The sample was then subjected to a flame-bending test in which the bar was held 1 at one end substantially horizontally, a weight of 1 kg was hung on the other end, and a bunsen burner flame was applied to the bar near its centre.

The aluminium bar clad with vermiculite-dressed glassfibre veil had not bent noticeably after application of the bunsen burner flame for a period of 10 minutes.

By contrast, a similar aluminium bar not clad with the vermiculite-dressed veil was seen to bend within 5 minutes after application of the flame, as also did a similar aluminium bar coated with sodium silicate solution and clad with a sample of the undressed veil.

EXAMPLE 12

18% by weight solids Vermiculite slurry was brushed uniformly over aluminium foil (45.7g/m$^2$) and whilst this layer was still wet, 50g/m$^2$ glassfibre tissue mat (type F4/50/AG supplied by Regina-Fibreglass Ltd.) was pressed into it. After drying for 24 hours at ambient temperature, the weight of vermiculite applied was determined as 22.9g/m$^2$. The vermiculite layer formed a good bond to both the glass fibre tissue and the aluminium foil.

The above laminated and uncoated aluminium foils were then subjected to a fire test over a Calor gas burner fitted with a circular jet of 40 mm diameter. The samples were held on a tripod stand 30 mm above the gas outlet jet. The temperature of the flame at this point was determined as 1075° C.

When a 200 mm×150 mm sample of uncoated aluminium foil was inserted into the above flame, the flame penetrated the foil within 1 to 2 seconds and caused the foil to peel back completely away from the flame.

When a 200 mm×150 mm sample of laminated foil was inserted into the same flame with the aluminium surface towards the flame, wrinkling and peeling of the aluminium foil occurred in the area immediately impinged by the flame; the vermiculite-bonded glassfibre backing remained tough and integrally intact up to 4 minutes and showed no sign of failure when re-inserted into the flame for longer periods of exposure.

EXAMPLE 13

The procedure of Example 12 was repeated using a more open-structured continuous strand glassfibre mat, Unifilo PS 271 (supplied by Balzaretti Modigliani Spa, Italy with glass fibre weight of 120g/m$^2$). In this sample, 41 g/m$^2$ vermiculite was applied to the aluminium foil.

When inserted into the flame at 1075°, the vermiculite-glasfibre layer remained intact after 10 minutes and continued to support the laminate rigid in the flame. As in Example 16, damage to the aluminium foil was localised; damage was confined to a ring 70 mm diameter immediately above the flame.

EXAMPLE 14

Vermiculite slurry (21% by weight solids) was spread with a knife coater over 53 g/m$^2$ wet-processed glassfibre tissue mat IE50U supplied by Regina Fibreglass Ltd. After drying, the weight of vermiculite was determined as 80 g/m$^2$.

Polyisocyanurate rigid foam laminate (30 mm thick) was produced on a Viking horizontal laminator at 4 m/minute by laying down the liquid foam chemicals dispensed from a reciprocating spray mixing-head traversley over the above vermiculite-glass fibre sheet, which was continuously fed from a roll. P2 Kraft paper (160g/m$^2$ paper coated with 18 g/m$^2$ LD-polyethylene) was used as the contact facing. The foam-forming ingredients, Part A and Part B, formulated as described below were separately fed to the mixing-head to provide an output of 5.3 kg/minute.

| | parts by weight |
|---|---|
| Part A | |
| An activator whose composition is described below | 36.2 |
| A catalyst composed of ethylene glycol (20 p.b.w), potassium acetate (20 p.b.w) and water (1.5 p.b.w) | 1.0 |
| Arcton 11 | 20 |
| Part B | |
| Polymeric MDI (isocyanate strength about 90%) | 100 |

The activator was composed of the following ingredients:

| | Parts by weight |
|---|---|
| Polyester from adipic acid, phthalic anhydride, propylene glycol, glycerol (OHV = 250) | 11.4 |
| A 50:50 mixture of oxypropylated tolylene diamine (OHV = 480) and oxypropylated triethanolamine (OHV 525) | 9.0 |
| An ethylene oxide/propylene oxide adduct | 2.0 |
| Cirrasol EN-MP (ethylene oxide-Oleyl cetyl alcohol adduct) | 2.0 |
| Trichloropropyl phosphate | 10.0 |
| Silicone L5340 | 0.8 |

After curing for 24 hours, the laminate was examined by the "ISO Cone" test at various times and compared with laminate prepared simultaneously with Kraft paper on both facings. The results (shown in Table 1) illustrate the excellent protective effect which the vermiculite-glassfibre facing gave to the foam. This vermiculite facing prevented ignition of the foam and remained as a crack-free barrier throughout the tests.

TABLE 1

RESULTS OF ISO CONE TESTS AT 620° C. SURFACE TEMPERATURE

| Laminate Facing | Time Under Cone (mins) | Weight loss of laminate (%) | Depth of Black Char at centre of sample (mm) | Depth of cracks (mm) | Width of cracks (mm) | Appearance of sample after test |
|---|---|---|---|---|---|---|
| Vermiculite + glass fibre | 1 | 10.9 | 3 | 0 | 0 | All facings were integral and uncracked during and after these tests. Foams were dimensionally stable ˣThere were fissures over foam surface under facing. |
| | 3 | 17.6 | 13 | 0 | 0 | |
| | 4 | 20.1 | 14 | 0 | 0 | |
| | 6 | 24.0 | 15 | 1-2 | 1-2 | |
| | 10 | 26.6 | 20 | 0.5-3 | 0.5-2ˣ | |
| Kraft Paper** # | 1 | 23.2 | 13 | 1 | 2 | Minor circumferential fissure |
| | 3 | 36.9 | 28 | 1 | 2 | |
| | 4 | 38.0 | 20 | 2 | 2 | Cracked char. Char severely distorted and shrunk at edge ˣThis sample showed severe scorching on the back face. |
| | 6 | 42.1 | 30 | 3 | 8 | |
| | 10 | 47.6 | 20* | 10 | 2-10ˣ | |

*There was no uncharred foam left in this sample.
\# All these samples ignited at 5 seconds followed immediately by rupture of the paper facing.
**This laminate does not illustrate the invention but is included for comparative purposes only.

EXAMPLE 15

Polyisocyanate foam laminate was prepared according to the technique described in Example 14. During part of the lamination run, Unifilo PS198 (a continuous strand glass fibre mat, previously stretched to break interstrand bonds, (supplied by Vetrotex (UK) Ltd. and manufactured by Balzaretti Modigliani SpA, Italy) was fed underneath the foam mixing-head so that this laminate was reinforced with glass fibre throughout the foam core.

Two samples of this laminate were subjected to the "Mini-Corner Fire Test" which is used to evaluate the surface burning characteristics of building materials. It is described in the following publications:

(a) The Society of the Plastics Industry, Inc. Serial No 22000.5, Feb 3, 1976, Factory Mutual Research (b) ASTM D20.30.03 Draft test method (Oct 1978)

The test method is significant since a corner provides a critical surface geometry for evaluating the fire response of material surfaces. It incorporates three adjacent surfaces (two walls and ceiling) providing a combined heat flux which includes the conductive, convective, and radiative responses of any specific burning material. This corner test affords good simulation of a fire within a corner of a building.

Figure 2:
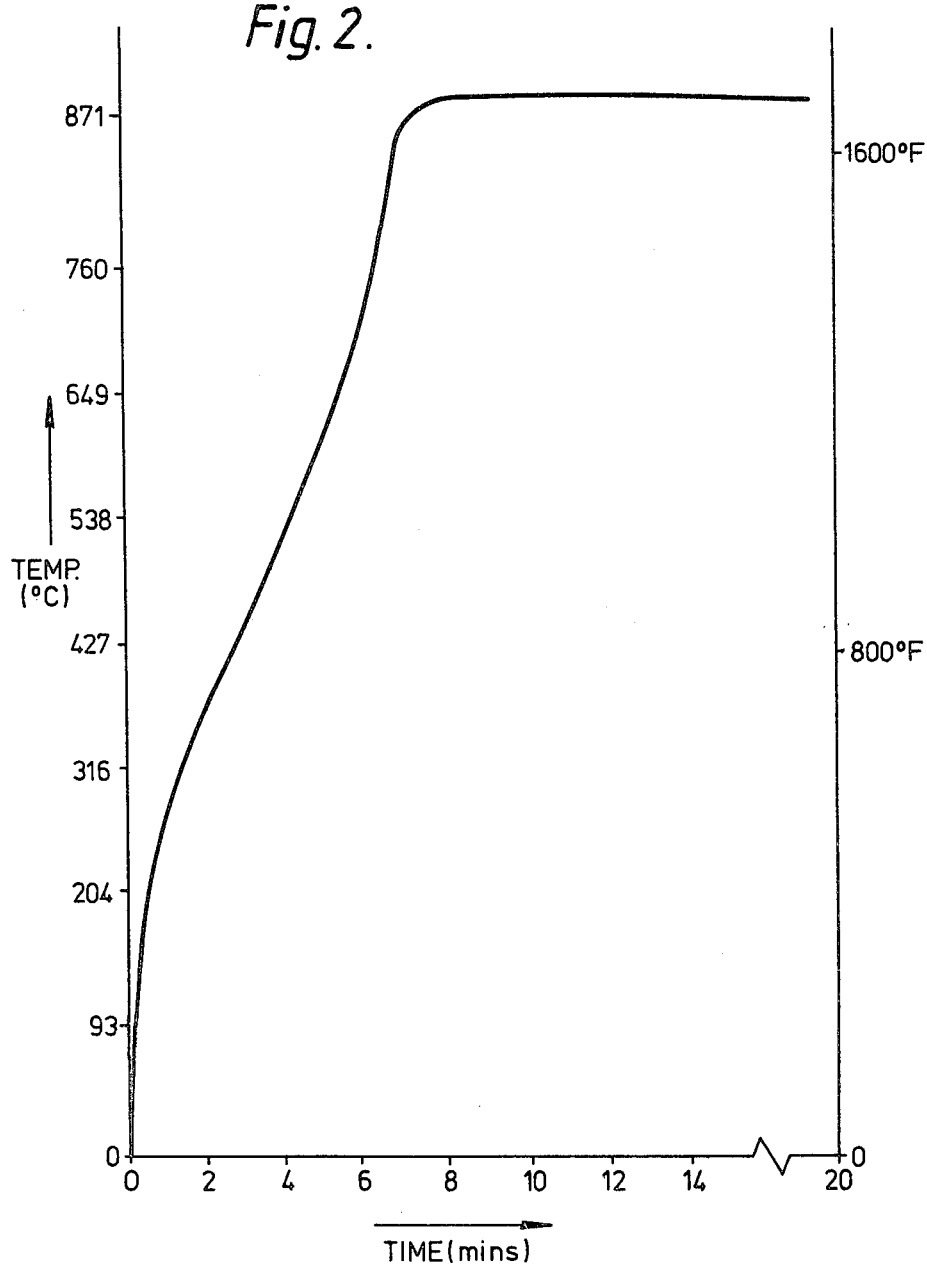
FIG. 2 is a graph plotting time against temperature for the mini-corner fire test of Example 15.

A test rig suitable for carrying out the Mini-Corner Fire-Test is illustrated in FIG. 1 of the accompanying drawing and is a diagrammatic perspective view of the test rig. The dimensions shown are with the test samples in place. It is constructed from an angle iron frame 11 covered with 6.4 mm asbestos cement board 13 on two side walls and ceiling. A gas burner 15 consists of a flat plate 17 with a square grid pattern of holes drilled in the surface. The holes are 2.4 mm diameter spaced in a 9×9 pattern with hole spacing of 7 mm. A mixing chamber (not shown) for the gas supply is cylindrical in shape 114 mm by 63 mm high. Separate propane gas and air streams are fed into opposing arms of an inverted 'T', brought into the chamber through the bottom and exhausted upwards. When the mixed stream is ignited, gas flows are adjusted to simulate the standard temperature/time curve shown in FIG. 2 of the drawings.

The laminated foam board to be tested was secured to the walls and ceiling within baffles 19 with the joints sealed with ceramic cement.

The two samples tested both survived the full 15 minute test duration with flames confined within 3 feet of the corner for most of the test. After extinction of the burner, the glassfibre/vermiculite facings were examined and found to be structurally integral and free from cracks. The foam was charred on the ceiling and partially on the walls. There were several cracks in the unreinforced foam char extending 6 to 24 inches from the corner. Only 1 minor crack was evident in the char of the glass fibre-reinforced laminate.

EXAMPLE 16

Separate glassfibre veil samples (IE50U) of weight 63.5 g/m² were coated by dipping with 10% by weight aqueous suspensions of Kaolin clay, montmorillonite, talc and delaminated vermiculite respectively. The samples of veil were dipped in the suspension, excess liquid was removed from them by squeezing with a roller, and the samples were air-dried at room temperature overnight, then heated at 80° C. in an oven for 30 minutes.

The dried samples of coated veil were separately placed over a bunsen stand and placed directly in a bunsen burner flame. The times were noted at which
 (i) the sample became deformed, i.e bends or sags and shrinks away from the flame, and
 (ii) the sample was penetrated by the flame.
The results are given below.

For puposes of comparison, an untreated sample of the veil was subjected to the same flame test.

| Coating | Time to deformation (secs) | Penetration (secs) |
|---|---|---|
| Koalin | 5 | 10 |
| montmorillonite | 3 | 20 |
| talc | — | 3 |
| Vermiculite | greater than 600 | greater than 600 |
| None | less than 1 | 1 |

EXAMPLE 17

This example illustrates the production of blocks. A suspension (2287.5g of 15% by weight solids content suspension) of delaminated vermiculite produced by the general procedure and wet classified by removal of particles of size greater than 50 microns was mixed with dionised water(881.3g) and a surface active agent available under the Trade Name Forafac (0.92g) and the mixture was whisked for 20 minutes at speed setting 4 in a Hobart food mixer fitted with whisk attachment to form a wet-foam or stable froth. The whisk attachment was then replaced by a dough-making attachment and glass fibre (412g–9 micron diameter:6mm staple) was mixed into the wet-foam over a period of 12 minutes, after which time a slurry of magnesium oxide powder (31g) in water (310g) was added and mixed into the wet-foam/fibre mixture for 1 minute.

The dough-like mixture was immediately cast in a mould of dimensions approximately 32.5cm×32.5cm×6cm and allowed to set for 30 minutes, after which time the resulting block was demoulded and dried on a plastic (Melinex) sheet in an oven at 100° C. to 130° C. overnight.

The block was a lightweight material of apparent bulk density 107 Kg/m$^3$ comprising randomly oriented glass fibres coated with vermiculite lamellae and bonded together by vermiculite lamellae at their points of contact. The block was stable to liquid water. The K-factor (at 25° C.) of the dry block was determined as 0.0463.

EXAMPLE 18

A slurry (994.7g) of vermiculite lamellae (189g) produced by the general procedure was mixed with dionised water (459.3g) Forafac surface active agent (0.3g) for 20 minutes in a Hobart food mixer fitted with whisk attachment at speed setting 4 to produce a wet foam. The whisk attachment was replaced by a dough-making attachment and glass fibres (81g–9 micron diameter:6mm staple) was mixed into the wet foam over a period of 12 minutes. A slurry of magnesium powder (18.9g) in water (189g) was then mixed into the wet foam/fibre mixture for 30 seconds and the mixture was immediately cast into a mould of dimensions approximately 20 cm×20 cm×5cm.

The resulting block was demoulded after 30 minutes and dried overnight at 100° C. in an oven.

The lightweight, dry block had a density of 90.8 Kg/m$^3$ and a K-factor (at 25° C.) of 0.043 and was stable to liquid water.

EXAMPLE 19

The procedure described in Example 17 was repeated exactly except that there was employed a suspension of vermiculite lamellae which had not been wet-classified to remove particles of size greater than 50 microns. The resulting dry block had a density of 115 Kg/m$^3$ and its K-factor (at 25° C.) was 0.049.

EXAMPLE 20

The procedure of Example 18 was repeated except that the vermiculite suspension employed was not wet-classified by removal of particles of size greater than 50 microns. The block had a density of 95 Kg/m$^3$ and its K-factor (at 25° C.) was 0.046.

EXAMPLE 21

Glass fibre strand (2g) of nominal diameter 9 microns and staple length 6mm was mixed in water for 3 minutes in a blender to disperse the fibres of the strands and produce a 0.4% by weight suspension of fibres.

A 7.1% by weight suspension of vermiculite lamellae (140g of suspension) produced by the general procedure and wet-classified as described was refiltered through a 50 micron sieve and then mixed into the suspension of glass fibres for 30 seconds. The suspension of fibres and vermiculite was mixed in a laboratory paper-making machine for 1 minute and then formed into a sheet on a wire mesh under the effect of gravity. The sheet on the wire was removed from the machine and lightly rolled to remove excess water and consoldiate the sheet. The sheet was carefully removed from the wire and dried at 120° C. in an oven for 10 minutes.

The dry sheet exhibited good strength, excellent flexibility and good flame-barrier characteristics.

EXAMPLE 22

Using the procedure described in Example 17 except that the Hobart mixer was used at speed setting 2 instead of 4, blocks of size 32.5 cm×32.5cm×6cm were made from classified 18% vermiculite slurry (3050g), deionised water (1175g), 6mm staple 9 micron diameter glass fibres(550g), magnesium oxide slurry (41.3g in 413g water) and Forafac surface active agent (1.22g). The dry block had a density of 97.1 Kg/m$^3$ The dry block was placed in an oven and heated at 900° C. for 3 hours. Measurements made on the block before and after the heat treatment indicated that shrinkage of the block during heating was only 1.13%. The fibrous structure of the block remained essentially intact. By way of comparison, a similar block made of "Rockwool" mineral wool fibres (without vermiculite) shrunk by 3.1% in the heat treatment. A glass fibre block without the vermiculite coating adhesive melted completely at 600° C.

EXAMPLE 23

A glass fibre/vermiculite block of density 193 Kg/m$^3$ produced by the procedure described in Example 17 was heated at 700° C. in an oven for 67 hours, during which time it shrunk by only 0.34%. A similar block heated at 800° C. for 24 hours shrunk by 1.2%.

EXAMPLE 24

Using the procedure described in Example 17 a block of dimensions 15 cm×15 cm×2.5cm was produced from a 19% vermiculite suspension (101.25g), Kaowool mineral fibres (Bulk B-101.25g), Forafac surface active agent (0.225g), deionised water (246g) and a slurry of magnesium oxide powder (10.1g) in water(l0lg). After drying at 80° C. overnight, the dry block had a density of 211 Kg/m$^3$.

The block was heated in an oven. Shrinkage of the block heated at 800° C. for 1 hour was 0.5%. Shrinkage of the same block heated further at 1000° C. for 1 hour was 0.94%.

We claim:
1. A fibrous composite material consisting essentially of at least 15% by weight non-combustible fibers, and at least 20% by weight lamallae of chemically delaminated vermiculite, the lamallae having a thickness of less than 0.5 micron and an aspect ratio of at least 10, the fibers being bonded together by the vermiculite.

2. A fibrous composite material as claimed in claim 1 wherein said fibres are present in the amount of at least 20% by weight.

3. A material as claimed in claim 1 wherein the fibres are glass fibres.

4. A material as claimed in claim 1 wherein the loading of the layer mineral is up to 100% by weight based on the fibres.

5. A material as claimed in claim 1 wherein the vermiculite lamellae are substantially all of maximum dimension below 50 microns.

6. A material as claimed in claim 1 wherein the fibres are present in the form of a layer of fibrous material.

7. A material as claimed in claim 1 in the form of a block of randomly oriented fibres bonded together at their points of contact by the vermiculite.

8. A material as claimed in claim 7 wherein the fibres are coated with said vermiculite.

9. A material as claimed in claim 1 which additionally contains a water-stability improver.

10. A material as claimed in claim 9 wherein the water stability improver is magnesium oxide.

11. A material as claimed in claim 1 wherein the chemically delaminated vermiculite is present in the form of a dry, rigid foam.

12. A material as claimed in claim 1 in which the vermiculite lamallae thickness is less than 0.05 micron.

13. A material as claimed in claim 12 in which the vermiculite lamallae thickness is less than 0.005 micron.

14. A material as claimed in claim 1 in which the vermiculite lamallae have an aspect ratio of at least 100.

15. A material as claimed in claim 14 in which the vermiculite lamallae have an aspect ratio of at least 1000.

16. A material as claimed in claim 1 in which the vermiculite lamallae are less than 0.005 micron thick and have an aspect ratio of at least 1000.

* * * * *